United States Patent [19]

Netting

[11] 3,888,957

[45] *June 10, 1975

[54] METHOD OF MAKING HOLLOW SPHERES BY SPRAY DRYING

[75] Inventor: David I. Netting, Springfield, Pa.

[73] Assignee: Philadelphia Quartz Company, Valley Forge, Pa.

[ * ] Notice: The portion of the term of this patent subsequent to Mar. 19, 1991, has been disclaimed.

[22] Filed: Mar. 17, 1972

[21] Appl. No.: 235,851

Related U.S. Application Data

[63] Continuation-in-part of Ser. No. 223,314, Feb. 3, 1972, abandoned.

[52] U.S. Cl. .................................................. 264/13
[51] Int. Cl. ............................................. B01j 2/02
[58] Field of Search ....................................... 264/13

[56] References Cited
UNITED STATES PATENTS
3,347,798   10/1967   Baer et al. ............................ 269/13

Primary Examiner—Robert F. White
Assistant Examiner—J. R. Hall
Attorney, Agent, or Firm—Fred Philpitt; Ernest G. Posner

[57] ABSTRACT

The invention relates to a process for the manufacture of an economical filler of low bulk density that is especially useful for incorporation in unsaturated polyester systems and which reacts very little with the components of the unsaturated polyester system. Solutions of sodium silicate and sodium pentaborate (or sodium hexametaphosphate) are mixed, spray dried, and the product from the spray drier is then further dried to a water content below about 7 percent.

8 Claims, No Drawings

METHOD OF MAKING HOLLOW SPHERES BY SPRAY DRYING

This application is a continuation-in-part of Ser. No. 223,314 filed Feb. 3, 1972, now abandoned.

BACKGROUND

Prior art workers have devised a number of different ways of producing fillers that consist of a mass of small hollow spheres. Such products have been produced from both organic and inorganic chemicals (as well as mixtures thereof) and vary in density, size, strength, chemical characteristics and utility. Although the primary use of such spheres has been as fillers, they also have a number of other uses, such as an insulation material. Some of these prior art processes utilize spray drying techniques.

The following patents are of some interest relative to the formation of particles of organic and inorganic material and may be of background interest:

| | | |
|---|---|---|
| 1,724,185 | 2,576,977 | 2,978,340 |
| 1,734,260 | 2,582,852 | 3,030,215 |
| 1,842,083 | 2,611,712 | 3,086,898 |
| 1,977,325 | 2,652,371 | 3,129,086 |
| 2,047,016 | 2,759,843 | 3,133,821 |
| 2,101,635 | 2,797,139 | 3,183,107 |
| 2,117,605 | 2,797,140 | 3,230,064 |
| 2,151,083 | 2,797,141 | 3,230,184 |
| 2,202,481 | 2,797,201 | 3,247,158 |
| 2,209,451 | 2,822,238 | 3,256,105 |
| 2,209,678 | 2,828,261 | 3,278,660 |
| 2,211,429 | 2,833,296 | 3,316,139 |
| 2,275,164 | 2,883,347 | 3,365,315 |
| 2,310,343 | 2,913,486 | 3,420,645 |
| 2,448,280 | 2,978,339 | 3,458,332 |

THE PRESENT INVENTION

The present invention is directed to an inexpensive method for producing small increments or particles of inorganic materials that are essentially in the form of hollow spheres and that are especially useful as fillers in plastic compositions. Considered from one aspect, the method of the present invention can be exemplified by the following sequence of steps (which may be considered in conjunction with the attached flow sheet). (The percentages are by weight unless otherwise specified.)

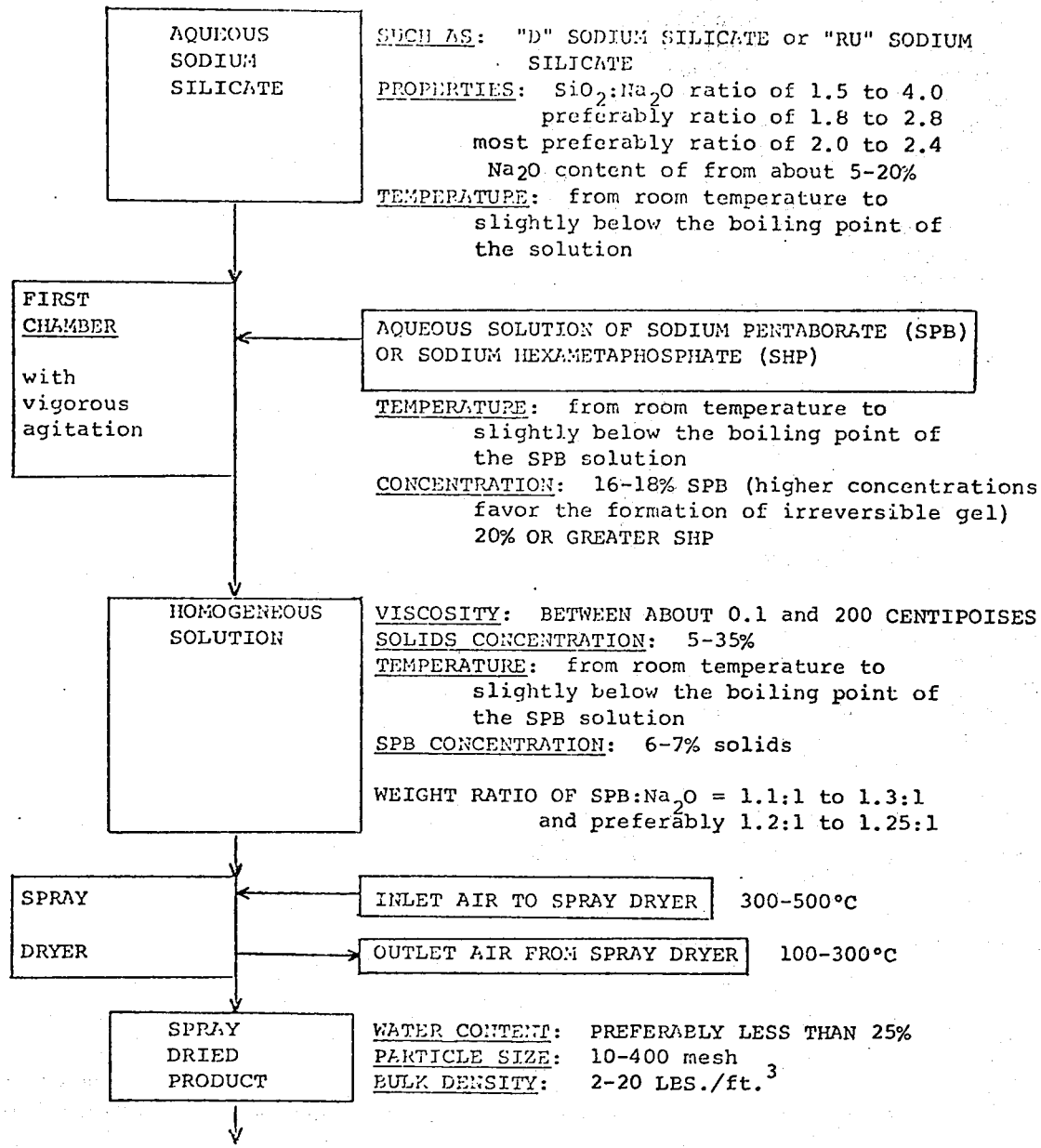

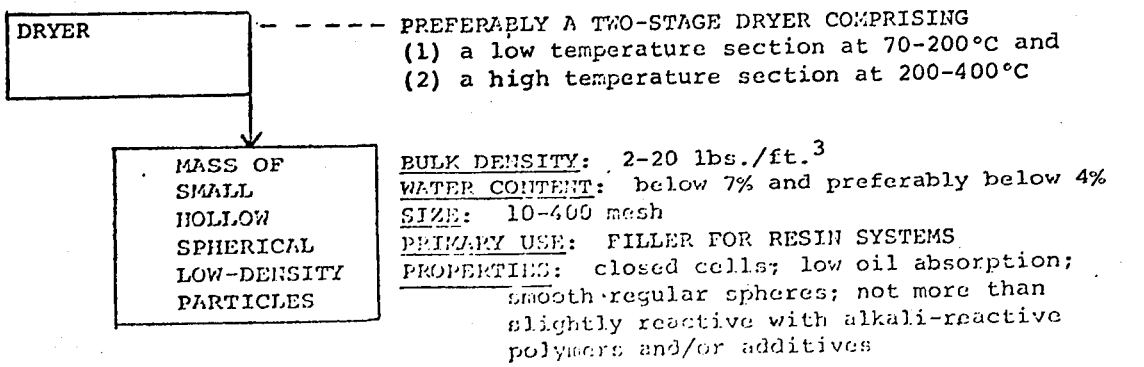

a. providing a first aqueous solution consisting essentially of sodium silicate that is characterized by a $SiO_2:Na_2O$ mol ratio of between about 1.5:1 and 4.0:1; and a $Na_2O$ content of 5 to 20 percent;

b. providing a second aqueous solution consisting essentially of sodium pentaborate having a concentration within the range of about 16-18%;

c. bringing said first and second solutions set forth in (a) and (b) together in a first chamber in such a way that said second solution is brought into intimate admixture with said first solution with such speed and efficiency that the formation of localized pockets of irreversible gel is substantially avoided, d. withdrawing a liquid stream from said first chamber before the contents of said first chamber, at a solids content of about 5% to about 35 percent, have had a chance to form any substantial amounts of an irreversible gel, the temperature of said withdrawn liquid stream being between about room temperature and a temperature slightly below the boiling point of the liquid stream, e. spray drying the liquid stream set forth in (d) and recovering a spray dried product, that consists essentially of a mass of small hollow spheres, f. subjecting the spray dried product of (e) to further drying at a temperature within the range of 70°C – 400°C for a time sufficient to reduce the moisture content below about 7 percent, and g. recovering a mass of generally hollow spherical particles having a bulk density of about 2–20 lbs./ft.$^3$; a particle size within the range of 10–400 mesh; and a water content of 0–7 percent.

While the $SiO_2:Na_2O$ range set forth in step (a) is quite satisfactory, I prefer to work within a $SiO_2:Na_2O$ ratio range of 1.8 to 2.8, and the range of 2.0 to 2.4 is especially preferred. The viscosity of the sodium silicate is not critical, the main requirement being that it not be so thick that it is difficult to mix with the pentaborate. The temperature of the aqueous sodium silicate may be at any temperature between room temperature and a little below the boiling point of the solution.

The concentration of the aqueous sodium pentaborate solution should usually be within the range of from about 16 to about 18 percent by weight. If higher concentrations are used it is difficult to mix with the silicate solution without irreversible gel formation. Solutions of sodium pentaborate are sufficiently reactive with the alkali to prevent much discoloration of polyester resin compositions, and simple to prepare. The temperature of the aqueous sodium pentaborate solution may be any temperature between room temperature and a little below the boiling point of the solution. Sodium pentaborate has the formula $Na_2O.5B_2O_3.10H_2O$ and consists of 10.5% $Na_2O$; 59% $B_2O_3$; and 30.5% $H_2O$.

The sodium pentaborate and sodium silicate may be brought together in any of several ways and the concentration of solids in the final homogeneous solution should preferably be within the range of about 5–35 percent. In my work I have found it preferable to add the pentaborate solution to a tank containing the silicate solution. The temperature should be between about room temperature and below the boiling point of the homogeneous solution. In order to minimize or avoid irreversible gelation, the sodium silicate at the higher ratios of $SiO_2:Na_2O$ will require more dilution and lower concentrations of the pentaborate. I may add warm pentaborate as a 16–18 percent solution to a warm or hot sodium silicate solution such as "D" sodium silicate and with sufficient agitation so as to avoid the formation of irreversible gel. Rather vigorous agitation is essential for the reason that if a high concentration of pentaborate salt is allowed to build up at any point, a gel will begin to precipitate. This should be avoided as much as possible. It is permissible to have very small particles of gel dispersed throughout the mixture so long as the gel particles do not form big enough lumps to condense and become non-dispersible (i.e. irreversible). (A "lump" is intended to means a visible concentration of solid.)

The liquid stream withdrawn from the aforesaid first chamber in step (d) preferably has a viscosity within the range of from about 0.1 to about 200 cp and preferably contains about 6 to 7 percent of sodium pentaborate solids. The weight ratio of SPB:$Na_2O$ may range from 1.1:1 to 1.3:1 and preferably is from 1.20–1.25:1.

Any of the available commercial spray drying systems may be used. The specific conditions of spray drying will of course vary with the particular spray dryer that is employed. Generally spray drying should be carried out at a temperature below the boiling point of the sprayed particles, i.e. to avoid intumescence. Nevertheless I can generally say that I prefer air inlet temperatures from about 200° to 500°C and air outlet temperatures ranging from about 100° to about 300°C. It is important in setting the inlet temperature to avoid actually boiling the droplets as they enter the spray dryer. However, the temperature should be high enough to obtain at least a limited expansion of the droplets in the spray drying zone.

When sodium hexametaphosphate is used instead of sodium pentaborate, a somewhat different order of procedures is possible. Since both are highly colloidal, they are one hundred percent miscible. Sodium hexametaphosphate however is much more acidic than sodium silicate and it may be necessary at times to adjust the pH to avoid irreversible gel formation. However the case may be, the sodium hexametaphosphate may be added directly as the undissolved solid or it may be dissolved and then mixed with the sodium silicate at an appropriate dilution as in the case of the sodium pentaborate. In order to prevent undue reaction with the polyester resin and/or its additives, the concentration of the sodium hexametaphosphate in the final or homogeneous solution should be greater than 20 percent and may be as much greater as desired provided the viscosity of the final solution is kept below 200 cp. The temperature and other conditions may be set as described for the sodium pentaborate.

The solid products removed from the spray dryer must have less than about 25 percent and preferably less than about 20 percent water in order to avoid aggregation or sticking of one particle to another.

The final drying step (f) is carried out slowly to reduce the total moisture of the spray dried product to below about 7 percent and I prefer a moisture between about 4 percent. The final drying step does not change the bulk density significantly because whereas there is a loss of weight as the water is removed there is also a slight shrinkage of the particles. Any convenient drying means is acceptable. It is only necessary to avoid significant intumescence.

A preferred apparatus for carrying out the final drying step is a rotary dryer having a low temperature section (e.g. 70°–200° C. and most preferably about 150° C.) and a high temperature section (e.g. 200°–400° C. and most preferably about 300° C.), and wherein air is passed through the dryer concurrently or countercurrently with the material to be dried. The purpose is to reduce the water content below the amount which will react to discolor a polyester resin composition and to avoid further expansion of the particles.

The typical polyester resin compositions in which my product is particularly effective are those with unsaturated polyester resins which are polycondensation products of mainly unsaturated dicarboxylic acids and dihydroxy alcohols cross-linked with unsaturated monomers. The acids are usually maleic or fumaric and the crosslinkers are usually styrene or diallyl phthallate. They are polymerized ordinarily with either benzoyl peroxide or methyl ketone peroxide and a cobalt salt accelerator.

EXAMPLES

Some of the following examples are illustrative of some preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature, and the pressure is atmospheric, unless otherwise indicated.

The spray dryer employed in Examples 1–4 was a Nichols-Niro portable spray dryer of the centrifugal atomizer type.

Several commercial silicates have been used in the Examples, such as "D" and "RU". These silicates are both made by the Philadelphia Quartz Company of Philadelphia, Pa., and this company is the owner of the trademarks D and RU. The properties of D sodium silicate are: a $SiO_2/Na_2O$ ratio of 2.0, a $Na_2O$ content of 14.7 percent, a water content of 55.9 percent and a viscosity of 400 cp. The properties of RU sodium silicate are: a $SiO_2/Na_2O$ ratio of 2.4, a $Na_2O$ content of 13.9 percent, a water content of 52.9 percent and a viscosity of about 2100 cp.

EXAMPLE 1

500 parts by weight of D sodium silicate at room temperature were slowly and thoroughly mixed with a warm aqueous solution containing 450 parts by weight of water and 90 parts by weight of sodium pentaborate (SPB) in a tank. The water used to dissolve the pentaborate was first heated to above about 60° C. This composition had a SPB to $Na_2O$ ratio of 1.22. The two were agitated together until all lumps were dispersed and dissolved, i.e. about 5 to 10 minutes.

The resulting homogeneous solution with a viscosity below about 200 cp was removed from said tank and fed to a spray dryer. The inlet temperature of the air entering the spray dryer was between about 390° and 420° C and the outlet temperature of the air leaving the spray dryer was between about 140°–160° C. The atomization pressure was 3 kg./cm². The product from the spray dryer had the following analysis:

$SiO_2$ — 45.3%

$Na_2O$ — 25.3%

$B_2O_3$ — 14.7%

$H_2O$ — 14.7% average particle size — minus 50 to plus 200 mesh bulk density — 5.4 lbs/ft.³ true density — 22.2 lbs/ft.³

The solid product recovered from the spray dryer was then dried in an oven in which the initial temperature was below about 100° C and gradually the temperature was raised to about 300° C over about 1 hour.

The product taken from the oven had the following properties:

$SiO_2$ — 50.6%
$Na_2O$ — 28.4%
$B_2O_3$ — 16.6%
$H_2O$ — 4.4%
bulk density — 5.5 lbs/ft.³ average particle size — minus 50 to plus 200 mesh

Nine parts of product from the oven were mixed with 100 parts by weight of a typical polyester resin [Polylite 32–353 from Reichold Chemical Company]. The Krebs viscosity was 400 g and the Brookfield viscosity was 1790 cP. The resin color developed only a light color change (light purple). The casting density was 54 lbs/ft.³ and increased only 58 lbs/ft.³ in 24 hours showing that the filler was essentially free of holes. The color of the casting was white when fresh and was grey after 24 hours.

When only 75 p.b.w. of SPB was used forming a composition with a SPB/$Na_2O$ ratio of 1.02, the final product had a high reaction with the typical unsaturated polyester resin composition used; that is the resin composition quickly turned purple. When 100 p.b.w. of SPB was used forming a composition with an SPB/Na₂O ratio of 1.36, the mixture gelled before it could be spray dried. With more dilute solutions of "D" sodium silicate or with other sodium silicate solutions somewhat different SPB/Na₂O ratios would be found effective, but the same principle applies.

Casting density depends on the particle size as well as the density of the filler. A similar filler which had a bulk density of 8.2 had the following particle size distribution and gave the following casting densities when used at 10 grams of filler per 100 grams of the resin of Example 1.

| | |
|---|---|
| −48 + 100 M | 59.5 No./ft.³ |
| −100 + 150 | 46.2 |
| −150 + 200 | 46.9 |
| −200 + 270 | 59.3 |
| −270 + 325 | 59.3 |
| −325 | 66.3 |

The following Table shows the relationship between the water content of my final product and the degree to which that product will react with a typical polyester resin.

| Ignition Loss | Reaction with Resin |
|---|---|
| 10% | High |
| 7.5 | do. |
| 5.8 | Moderate |
| 4.7 | Slight |
| 3.4 | Very slight |
| 2.2 | No reaction |

It is thus seen that I prefer my final product to have a water content below about 7 percent and preferably below 4 percent.

EXAMPLE 2

In this example 200 parts by weight of D sodium silicate were diluted with 200 parts by weight of water and 100 parts by weight of sodium hexametaphosphate (a polyphosphate) was dissolved in the diluted silicate and spray dried using the Nichols-Niro spray dryer described in Example 1 at an atomization pressure of 2.5 kg. The air temperature at the inlet was 415° C. and at the outlet the temperature was 150° C. The product was further dried as in Example 1 and was then found to have an ignition loss of 1.5% and a bulk density of 4.7 lbs./ft.³. The product was tested in polyester resin as in Example 1 and was found to have only a moderate reaction. Since there is no solubility limit in mixing this colloidal polyphosphate with sodium silicate, such a system with more than about 20 percent polyphosphate will show little or no reaction with the resin and, if an ammonium polyphosphate is substituted, there will be no reaction visible.

Utility

As indicated earlier, our invention is particularly useful as a filler, and particularly as a filler for simulated wood. Wood used in furniture manufacturing has a density of about 30–45 lbs/ft.³ and is strong and versatile. However, quality wood is becoming scarce and skilled craftsmen capable of carving furniture parts get very high wages. As a consequence the furniture industry is being forced into the use of synthetics. There are three basic competitors for this furniture market: polyurethane foam, injection molded polystyrene, and the unsaturated polyesters. The injection molded polystyrene requires a very large capital investment, but is good for mass production of many parts. Molded polyurethane foam is widely used in the industry but molded parts must be made with a very low density (25–28 lbs/ft.³) to make them economical because of the high cost per pound of polyurethane. The low density makes the polyurethane foam unusable for many structural parts. Unsaturated polyester resins are very well suited for all furniture parts, but their high density (70–80 lbs/ft.³) puts them at an economical disadvantage despite their low price. A low cost, low density filler is therefore needed to reduce the cost per cubic foot of polyester resin and at the same time make the polyester parts have about the same density, feel, sound and appearance as wood. The light weight filler must not absorb the resin or react with the resin.

This invention is especially related to fillers for polyesters and especially unsaturated polyesters. In more general terms, we use our product as a filler for thermosetting polymers such as the polyesters, the epoxys, phenol-formaldehyde and also for latexes such as silicone latex. It also may be used for compositions of thermoplastics which are later molded by raising the temperature.

In summary then, the advantages of the product of our invention, when used as an extender or filler are as follows:

1. Low cost;
2. low reaction with alkali-reactive polymers and additives;
3. low oil absorption;
4. free from holes large enough to absorb any significant amount of resin;
5. spheres having a film strength sufficient to retain their shape and avoid breakage when incorporated in viscous resin formulations.

POSSIBLE MODIFICATIONS OF THE INVENTION

When a patent eventually issues to one company, it sometimes happens that a competing company will take the position that the patent does not cover what the competing company is doing on the grounds that what the competing company is doing is not specifically spelled out in the patent. In such a situation the competing company will often try to argue that the slightly different procedure that the competing company is using was not even contemplated by the inventors. Although the courts will usually apply the "doctrine of equivalents" in such situations to protect the patent owner, the court itself is often in at least some doubt as to what possible modifications the inventors did have in mind. Accordingly, it is believed that it would be worthwhile to set forth here some of the possible substitutions of materials and alternative procedural steps that we believe would readily suggest themselves to those skilled in this art.

First of all, I think that one skilled in the art might be inclined to try to substitute potassium silicate for the sodium silicate set forth in step (a). If a potassium silicate is used, the ratio of $SiO_2/K_2O$ can be within the range of 1.5:1 to 4.5:1.

Secondly, I think one skilled in the art might be inclined to try to combine steps (a), (b) and (c) above into a single step by introducing the silicate, pentaborate and water into a single reaction or mixing zone so as to end up with the same reaction product that is defined in step (d) above.

Thirdly, I think one engaged in this art might be inclined to try to substitute for the sodium pentaborate or sodium hexametaphosphate of step (b) a polysalt that would be colloidal, not cause coacervation, and which would not react too rapidly to reduce the alkalinity of the alkali silicate. While some polysalts might be workable, we have found that borax, boric acid, trisodium phosphate, ammonium phosphate, ammonium oxalate, ammonium phosphate, ammonium chloride, ammonium carbonate and dibasic calcium phosphate are not very satisfactory.

Fourthly, I think one skilled in the art might try to use a drying temperature that is outside of the range set forth in step (f), possibly in conjunction with somewhat different ratios or percentages than are set forth in steps (a) – (e), in order to find a suitable combination of parameters that would fall outside of the scope of the claims. Such experimentation, even if successful, would obviously not depart from the basic concept of the invention.

Accordingly, it should be understood that I do not consider that any such departures from the very specific parameters set forth in the claims are in any way a departure from the inventive concept that I have disclosed, and I intend to rely upon the well known doctrine of equivalents insofar as any such departures are concerned.

What I claim is:

1. A method of producing hollow spheres having a size of 10–400 mesh and being free from holes, comprising:
    A. mixing in a chamber:
        1. a first aqueous solution consisting essentially of sodium silicate having an $SiO_2:Na_2O$ mole ratio of 1.5:1 to 4.0:1 and an $Na_2O$ content of 5 to 20 percent on a weight basis, maintained at a temperature between room temperature and the solution boiling point, and
        2. a second aqueous solution consisting essentially of 16 to 18 percent sodium pentaborate on a weight basis, maintained at a temperature between room temperature and the solution boiling point,
    to produce with agitation a homogeneous third aqueous solution having a solids concentration of 5 to 35 percent, a sodium pentaborate concentration of 6 to 7 percent and a weight ratio of sodium pentaborate to $Na_2O$ of 1.1:1 to 1.3:1 maintained at a temperature below said third solution boiling point;
    B. spraying droplets of said third aqueous solution into a dryer utilizing air having an inlet temperature between 200° C and 500° C while maintaining said droplets entering said dryer at a temperature below said third solution boiling point and recovering a product consisting essentially of a mass of hollow spheres having a water content less than 25 percent;
    C. subjecting said spray dried product to further drying at a temperature between about 70° – 400° C for a time sufficient to reduce the moisture content below about 7 percent and avoiding intumescence, and
    D. recovering a mass of generally hollow closed spherical particles having a bulk density of about 2 – 20 lbs./ft.$^3$ and a particle size within the range of 10 – 400 mesh.

2. A method according to claim 1 wherein the aqueous sodium silicate solution has an $SiO_2:Na_2O$ ratio of between about 1.8:1 and 2.8:1.

3. A method according to claim 1 wherein the aqueous sodium silicate solution has an $SiO_2:Na_2O$ ratio of between about 2.0:1 and 2.4:1.

4. A method according to claim 1 wherein said homogeneous third solution has a viscosity of 0.1 to 200 cp.

5. A method according to claim 1 wherein the spheres recovered in step B. have a water content of less than 20 percent.

6. A method according to claim 1 wherein the product recovered in step C. has a moisture content below 4 percent.

7. A method according to claim 1 wherein the drying step C. is carried out in two stages including a first stage maintained at a temperature between 70° and 200° C and a second stage maintained at a temperature between 200° and 400° C.

8. A method of producing hollow spheres having a size of 10–400 mesh and being free from holes, comprising:
    A. mixing in a chamber:
        1. an aqueous solution consisting essentially of sodium silicate having an $SiO_2:Na_2O$ mole ratio of 1.5:1 to 4.0:1 and an $Na_2O$ content of 5 to 20% on a weight basis, maintained at a temperature between room temperature and the solution boiling point, and
        2. sodium hexametaphosphate,
    to produce with agitation a homogeneous final aqueous solution having a solids concentration of 5 to 35 percent, a sodium hexametaphosphate concentration of at least 20 percent and a viscosity below 200 cp, maintained at a temperature below said final solution boiling point;
    B. spraying droplets of said final aqueous solution into a dryer utilizing air having an inlet temperature between 200° C and 500° C while maintaining said droplets entering said dryer at a temperature below said third solution boiling point and recovering a product consisting essentially of a mass of hollow spheres having a water content less than 25 percent;
    c. subjecting said spray dried product to further drying at a temperature between about 70°– 400° C for a time sufficient to reduce the moisture content below about 7 percent and avoiding intumescence, and
    D. recovering a mass of generally hollow closed spherical particles having a bulk density of about 2 – 20 lbs./ft.$^3$ and a particle size within the range of 10 – 400 mesh.

* * * * *